(12) United States Patent
Yoshihiro et al.

(10) Patent No.: US 7,668,693 B2
(45) Date of Patent: Feb. 23, 2010

(54) METHOD FOR THE EVALUATION OF MEASUREMENT UNCERTAINTY, AND A DEVICE AND SYSTEM THEREOF

(75) Inventors: Kazuo Yoshihiro, Singapore (SG); Tadashi Endo, Tokyo (JP)

(73) Assignee: Calibration & Testing International Pte., Ltd., Singapore (SG)

( * ) Notice: Subject to any disclaimer, the term of this patent is extended or adjusted under 35 U.S.C. 154(b) by 68 days.

(21) Appl. No.: 12/025,391

(22) Filed: Feb. 4, 2008

(65) Prior Publication Data
US 2008/0125982 A1    May 29, 2008

Related U.S. Application Data

(63) Continuation of application No. PCT/SG2005/000268, filed on Aug. 4, 2005.

(51) Int. Cl.
*G01F 17/18* (2006.01)
*G01F 23/00* (2006.01)

(52) U.S. Cl. .................. 702/179; 73/1.01; 324/115; 342/171; 702/53

(58) Field of Classification Search .................. 702/53, 702/85, 100, 179; 324/115, 171; 73/1.01; 342/171
See application file for complete search history.

(56) References Cited

U.S. PATENT DOCUMENTS 5,396,168 A * 3/1995 Heep et al. .................. 324/115
6,046,696 A * 4/2000 Blanco ........................ 342/171
6,640,607 B2   11/2003 Abbe

FOREIGN PATENT DOCUMENTS

DE     10120235     10/2002
JP     2002267436    9/2002

OTHER PUBLICATIONS

DE 10120235 A1, English translation by machine.*
Barwick et al., Measurement uncertainty: Approaches to the egvaluation of uncertainties associated with recovery, Analyst, 1999, 124, 981-990.
Phillips et al., Calculation of Measurement Uncertainty Using Prior Information, vol. 103, No. 6, Nov.-Dec. 1998, Journal of Research of the Nat. Inst. Of Standards and Technology.
Cox et al., Software Specifications for Uncertainty Evaluation, Report to the National Measurement System Directorate, Department of Trade and Industry, Mar. 2004, NPL Report CMSC 40/04.
Search Report for WO 2007/015682.

* cited by examiner

*Primary Examiner*—John H Le
(74) *Attorney, Agent, or Firm*—Woodard, Emhardt, Moriarty, McNett & Henry LLP

(57) ABSTRACT

A method for evaluating uncertainty associated with the value of a measurand derived from measurements of a device under test is disclosed. A mathematical model is provided wherein the measurand is expressed as a function of (i) at least one physically observable quantity, and (ii) the reference value of the physically observable quantity in a reference device. The reference value of the reference device and the value of the measurand of the device under test are measured. The value of the at least one physically observable quantity is also measured. At least one uncertainty value is determined as a function of the physically observable, wherein the mathematical model takes into account the at least one source of uncertainty and the reference value of the reference device.

27 Claims, 10 Drawing Sheets

| Model Component | Physical Meaning |
|---|---|
| $R_x$ | Resistance of the unit under test |
| $R_{ref}$ | Resistance of the reference calibrated by an upper organization |
| H | Ratio of $R_x$ to $R_{ref}$ directly obtained from DMM reading |
| $\Delta H_{rinp}$ | Correction to H associated with DMM input resistance |
| $\Delta H_{resol}$ | Correction to H associated with DMM resolution |
| $\Delta H_{leak}$ | Correction to H associated with DMM circuit insulation |
| $\Delta H_{ther}$ | Correction to H associated with thermal electromotive force in the circuits |
| $\Delta H_{add}$ | Correction to H associated with other sources |
| $\Delta R_{ref.temp}$ | Correction to $R_{ref}$ associated with difference in temperature between $R_x$ measurement and $R_{ref}$ calibration |
| $\Delta R_{ref.power}$ | Correction to $R_{ref}$ associated with difference in power consumption between $R_x$ measurement and $R_{ref}$ calibration |
| $\Delta R_{ref.drift}$ | Correction to $R_{ref}$ associated with drift of reference resistance values in time |
| $\Delta R_{ref.trans}$ | Correction to $R_{ref}$ associated with transportation |
| $\Delta R_{ref.add}$ | Correction to $R_{ref}$ associated with sources other than above |
| $\Delta R_{x.add1}$ | Correction to $R_x$ associated with source 1 other than above |
| $\Delta R_{x.add2}$ | Correction to $R_x$ associated with source 2 other than above |

| Model Component | Physical Meaning |
|---|---|
| $M_x$ | Unknown weight mass under temperature $t_{temp} = T$ |
| $(k/g)_0$ | Electric current-mass conversion factor when external temperature $t = t_0$ |
| $\Delta(k/g)_T$ | Correction to $(k/g)_0$ based on the temperature difference between $t_0$ and $T$ |
| $(I_x - I_{ref})_T$ | Difference of feedback electric current of DMM when we put main reference weight and unknown weight on the balance table, respectively |
| $\Delta(I_x - I_{ref})_{lin}$ | Correction to non-linearity of DMM indication |
| $\Delta I_{res}$ | Resolution capability of DMM for electric current |
| $M_c$ | Nominal value of counter weight mass |
| $M_{ref}$ | Calibrated value of main reference weight by upper level calibration laboratory |
| $\Delta M_{buo}$ | Correction to the difference of buoyancy between main reference weight and unknown weight |
| $m_{ref}$ | Mass of sub main reference weight to be used for the calibration |
| $(I_{cal} - I_{ref})_0$ | Difference of feedback electric current when measuring electric current-mass conversion factor, adding sub-reference weight to main reference weight (external temperature $t = t_0$) |

Figure 9

METHOD FOR THE EVALUATION OF MEASUREMENT UNCERTAINTY, AND A DEVICE AND SYSTEM THEREOF

RELATED APPLICATION DATA

This application is a continuation of PCT/SG2005/000268 filed Aug. 4, 2005, the disclosure of which is hereby incorporated by reference.

BACKGROUND

This invention relates to the evaluation of uncertainty, in particular, a method for evaluating uncertainty in measurements carried out by measuring equipment. The invention also relates to computer programs for carrying out said method and a computer programmed system containing said computer programs, a system for measuring and evaluating uncertainty associated with said measurement.

Calibration of measurement equipment and testing of products are commonly carried out by calibration and testing laboratories, as well as manufacturing companies to assess conformity to measurement standards, including but not limited to international standards, such as ISO/IEC guides and standards. On the other hand, calibration and testing laboratories are audited by laboratory accreditation systems to assess for conformity to ISO/IEC 17025 standard (ISO/IEC 17025—General requirements for the competence of testing and calibration laboratories).

As a requirement to conform to ISO/IEC 17025, accredited testing and calibration laboratories and in-house laboratories of manufacturing companies are required to evaluate uncertainty in their measurement result or calibration result, and to include such uncertainty evaluation in the test results or the calibration certificates that accompanies the products.

In principle, measurement uncertainty is associated with the result of a measurement that defines the range of values that could reasonably be attributed to the measured quantity. When expressed in a specific form, uncertainty is indicated by the level of confidence that the value of the measured quantity lies within a range defined by an uncertainty interval. In real life, any measurement is subject to imperfections and errors (both systematic and random). This means that a measurement is incomplete without an estimation of the uncertainty associated with the measurement. Accordingly, a measurement result should be accompanied by an estimation of its uncertainty so that a user can tell how accurately the measurement result represents the true value of the measured quantity, or the user can assess the reliability of the result in comparison with reference values or results from different sources.

In accordance with the ISO standards, errors can be fundamentally divided into two categories, namely, random errors and systematic errors. Random errors, such as random fluctuations of temperature, humidity and air-pressure, would affect to the measurement result randomly. Systematic errors, such as measurement instrument's circuit insulation, resolution, could be estimated either from physical theory, technical specification of measurement equipment, manufacturer's manual or long time observed data of equipments. In the course of a measurement, errors arise due to factors that influence the outcome of a measurement. For example, resistance measurements carried out in an environment where temperature fluctuates may give rise to large variations in the measured value of resistance.

Effects of random errors can be evaluated by repeated measurement results, while effects of systematic errors can be estimated from extensive experience in metrology, technical specification of measurement equipment, manufacturer's manual or long time observed data of those equipments.

Accordingly, the uncertainty in the value of a measurand is generally arrived at based on several mathematical components. These components may be grouped into two categories according to the way in which their numerical value is estimated. Those which are evaluated by statistical methods are classified as type A, and those which are evaluated by other means are classified as type B. The final report of uncertainty should contain a complete list of all the components and specify for each component the method used to obtain its numerical value.

Over the years, different mathematical procedures have been developed for calculating measurement uncertainty. To provide a basis for the international comparison of measurement results, the Guide to the Expression of Uncertainty in Measurement (GUM) was published by ISO in 1993 and has since been widely accepted for a wide range of measurements among many countries. As a technical requirement of ISO/IEC 17025, uncertainty evaluation is recommended to be executed based on ISO-GUM.

U.S. Pat. No. 6,640,607 discloses a method and apparatus for calibrating measuring machines. To manage uncertainty in measurement using measuring machines, this method is capable of achieving automated calibration, in contrast to the previous ones which perform calibration by a skilled worker. To achieve automated calibration, the patent discloses the steps of positioning a reference measuring machine previously calibrated and an object measuring machine to be calibrated in such a manner that a measurement space by the reference measuring machine is superimposed on a measuring space by the object measuring machine; acquiring first measurement values from the object measuring machine and second measurement values from the reference measuring machine; and calibrating the object measuring machine based on the first and second measurement values.

In Japanese patent 2002-267436 A, a method of estimating uncertainty of coordinate measurement of one point is proposed. The method estimates the uncertainty of coordinate measurement of a calibrated coordinate measurement machine (CMM) based on the uncertainty of length measurement of said calibrated CMM. In particular, the method addresses problems associated with modelling the behaviour of uncertainty in a CMM.

The Danish Technological Institute developed a software named "GUM Workbench" for the calculation of measurement uncertainty. This software supports calculation of statistical treatment of uncertainty evaluation based on ISO-GUM. However, the software does not include a function which would enable it to be associated with physical measurement equipments to support measurement. Therefore, GUM Workbench cannot be used for high-end national laboratories research level. However, it is not suitable for practical use in testing and calibration laboratories or manufacturing industries.

Other approaches for uncertainty evaluation exist as well. For example, S. D. Phillips et al. [1] propose a method for calculating measurement uncertainty using prior information. Bayesian inference is used to include prior information about the value of the measurand in the uncertainty calculation. Another approach by V. J. Barwick et al. [2] aims at the estimation of the uncertainty associated with recovery particularly in relation to analytical chemistry. In addition, M. G. Cox and P. M. Harris [3] present software specifications for uncertainty evaluation according to ISO-GUM.

Despite the development of methods for evaluating uncertainty and its implementation by many parties, most methods involve mainly the mathematical or statistical treatment for uncertainty evaluation of measured value. None of above methods, software and equipments explains sources of uncertainty quantity by quantity. Besides, sources of uncertainty vary from one particular measurement system to another, and can only be identified from experience. Existing methods do not adequately take such sources of uncertainty into consideration in the mathematical evaluation.

Accordingly, it is an object of the present invention to propose, clarify and evaluate uncertainties source by source and finally reach the uncertainty evaluation budget table. It is an additional object of the present invention to provide a system which is suitable for practical uncertainty evaluation in testing and calibration laboratories and manufacturing industries.

SUMMARY OF THE INVENTION

According to a first aspect of the present invention, there is provided a method of evaluating uncertainty associated with the value of a measurand derived from measurements of a device under test. The method comprises providing a mathematical model in which the measurand is expressed as a function of (i) at least one physically observable quantity, said quantity being associated with at least one source of uncertainty in the measurement of the device under test, and (ii) the reference value of said physically observable quantity in a reference device. Measurements of the reference value of the reference device as well as the value of the at least one physically observable quantity are made. Uncertainty values are then determined from the measurements using the provided mathematical model. The mathematical model is formulated to take into account the value of the at least one source of uncertainty and the reference value of the reference device.

The above method is based on the uncertainty evaluation method proposed by the International Organisation for Standardisation (ISO) in the document "Guide to the Expression of Uncertainty of Measurement" (ISO-GUM). In principle, the method comprises a first step of modelling the measurement with a view to establishing mathematically the relationship between the measurand and all sources of uncertainties which may contribute to the uncertainty associated with the measurement. In the second step, measurement values of the measurand and values regarding each source of uncertainty which contribute to the combined uncertainty are obtained. In the last step, numerical and statistical analysis is carried out to evaluate uncertainty of the measurand following the ISO-GUM procedure.

In another aspect, this invention relates to a computer program for executing the above mentioned method. The computer program contains a graphical user interface (GUI) for users to control the execution process. This invention also relates to a computer program product, such as a storage medium, containing the above computer program.

In a further aspect, this invention relates to a system for practical measurement and evaluation of associated uncertainty. The system consists of measurement equipments for physical measurement, a process control equipment unit for controlling the measurement equipments, and a computer programmed process control unit for evaluating uncertainty associated with the value of a measurand derived from measurements.

In another aspect, the invention relates to a switch box for automating the measurement of electrical resistance of a device under test and a standard resistor providing a reference value. The switch box comprises a first connector for attaching the device under test, a second connector for attaching the standard reference resistor, and a resistance comparator connected to the first and second connectors.

These aspects of the invention will be more fully understood in view of the following description, drawings and non-limiting examples.

BRIEF DESCRIPTION OF THE DRAWINGS

FIG. 4 lists and explains all the components of the mathematical model corresponding to the example of FIG. 2.

FIG. 5 is an example of a graphic window showing the proposed mathematical model and the explanation of some components according to another embodiment of this invention as a computer program.

FIG. 9 lists and explains all the components of the mathematical model corresponding to the fourth embodiment of FIG. 8.

DETAILED DESCRIPTION

Figure 1:
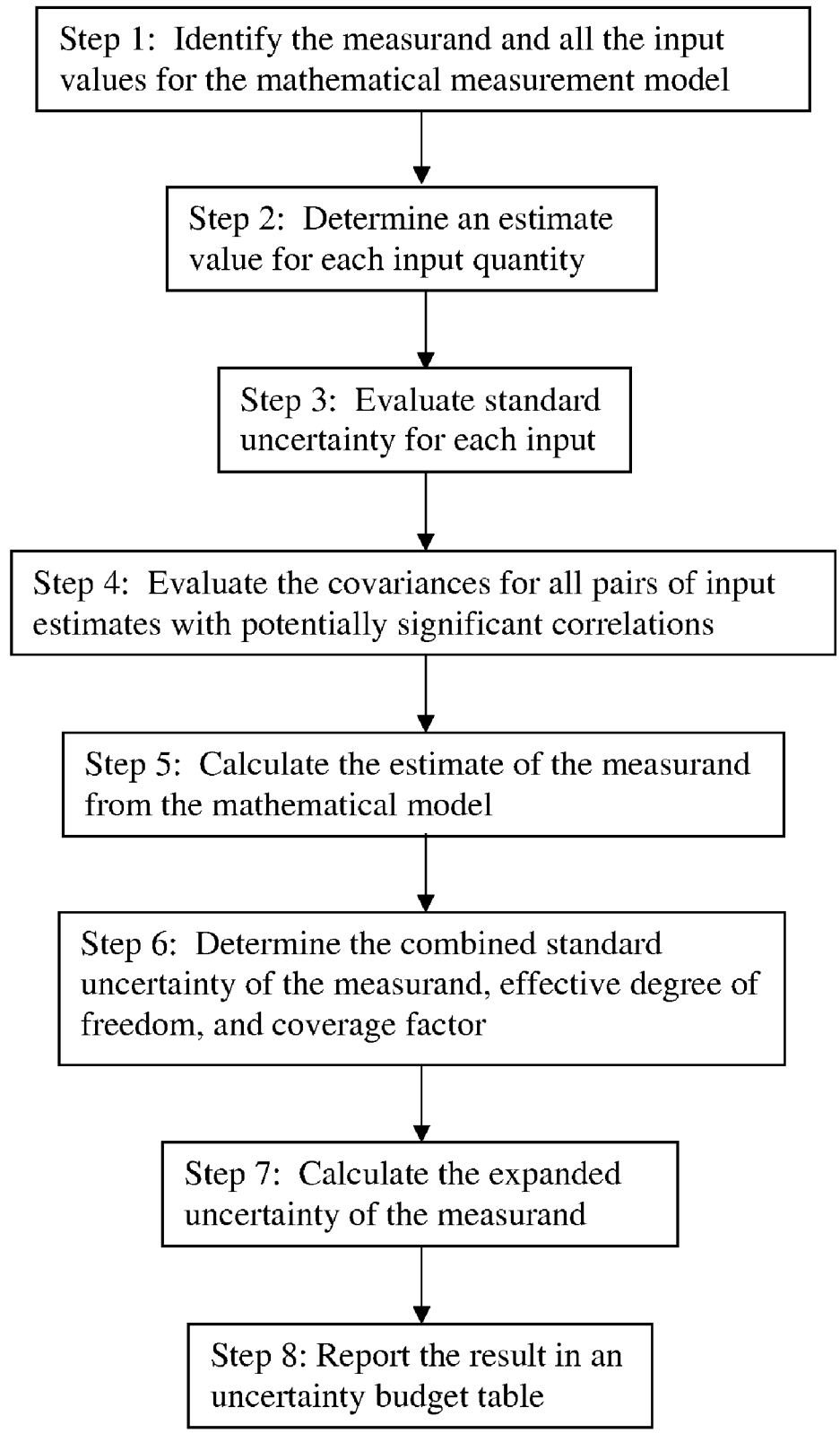
FIG. 1 is the procedure of uncertainty evaluation according to ISO-GUM.

The present invention is based on the finding that the evaluation of uncertainty can be made highly accurate by carrying out calculations of uncertainty values based on a user-selected mathematical model which not only takes into consideration sources of uncertainty associated with the measurements carried out on the device under test (hereinafter referred to as "DUT"), but also incorporates modification functions from a user based on the user's metrological experience.

Furthermore, the measuring equipment may be controlled to perform measurement by least factors of uncertainties based on empirical metrological experience. Thus, the invention provides a method for precise measurement of specific measurand is presented with an idea of measurement by least level of uncertainty.

In the mathematical model, the measurand, i.e. the quantity to be evaluated in a DUT, is expressed as a function of at least two variables, namely, a physically observable quantity which is typically associated with one or more sources of uncertainty, and the reference value of a standard device. For example, measurements may be designed to determine the mass of a DUT (the measurand) from measurements of DC current (the physically observable quantity) in a circuit that is coupled to the mass of the DUT. In another example, measurements may be designed to determine the resistance of a resistor from a digital multimeter placed across the resistor. The mathematical model thus provides a relationship between a measurand, and the sources of uncertainty associated with the measurement, thereby allowing a user to identify factors which contributing significantly to uncertainty and consequently to fine-tune the measurement environment, measuring equipment and measurement method in order to reduce the sources of uncertainty in a measurement.

The invention can be used for evaluating uncertainty in the measurement of any type of physically observable quantity such as mass, length, and electrical resistance etc. In a preferred embodiment, the present method can be used to evaluate quantities whose dimensions are expressed in base units specified in the International System of Units (SI units). Examples of SI units include length (meter), mass (kilogram), time (second), electric current (ampere), thermodynamic temperature (kelvin), amount of substance (mole), and luminous intensity (candela). In other embodiments, derived quantities whose dimensions are expressed in SI-derived units such as force (newton), pressure (pascal), quantity of heat (joule), power (watt), electric charge (coulomb), electric potential difference (volt), capacitance (farad), electric resistance (ohm), electric conductance (siemens), magnetic flux (weber), magnetic flux density (tesla), inductance (henry), temperature (Celsius), luminous flux (lumens), illuminance (lux), and activity of a radionuclide (becquerel) may be measured by the present method. Physically observable quantities may be readily measured by any conventional measuring equipment. Examples of physically observable quantities include current, voltage, capacitance, temperature, light intensity and radioactive decay.

As used herein, the term "physically observable quantity" refers to a quantifiable physical property of the DUT, such mass or electrical resistance or those listed above, that can be measured using any available measuring device. The value of the measurand obtained through the measurement may be associated with sources of uncertainty associated with the measurement, e.g. fluctuations in temperature, pressure, humidity in the measurement environment, or non-ideal characteristics in the measuring equipment. The term "physically observable variable" is used herein to refer to quantifiable physical properties (distinct from the "physically observable quantity") of the measurement environment or of the equipment used to measure the measurement environment used to evaluate the sources of uncertainty. For example, when evaluating the influence of temperature as a source of uncertainty in resistance measurements, temperature in the measurement environment is measured with a thermometer; temperature is therefore a 'physically observable variable'.

In one embodiment, the method of the invention further comprises selecting the sources of uncertainty associated with (i) the measurement of the at least one physically observable quantity, (ii) the measurement of the reference value of the reference device, or (iii) the measurement of the value of the measurand. For example, the accuracy of a measurement of resistance of a resistor using a digital multimeter may be known to be affected by factors such as fluctuations in the temperature of the measurement environment and the electrical contact between the components in the measuring equipment. Thus, if the measurement is carried out in an environment where temperature fluctuates, the temperature of the environment is preferably selected as a source of uncertainty. The sources of uncertainty associated with such measurements may be selected randomly or preferably, based on empirical metrological knowledge about the factors in the measurement environment which deviate from the ideal, or imperfections in the measuring equipment. Empirical knowledge may be possessed by a human operator having experience in metrology. Alternatively, knowledge concerning the possible sources of uncertainty may be compiled in a database and experimental data from numerous experiments can be compiled and analysed statistically to determine which sources of uncertainty are significant i.e. contributes error beyond a threshold level (and thus need to be taken into consideration) for a given experimental setup. To automate the selection process, a computer program may be implemented to automatically select appropriate sources of error, in particular those that contribute significant error for a user-specified set of experimental conditions.

When implementing the method of the invention in the form of a computer program, a user may be presented with a list of sources of uncertainty affecting the value of the measurand that are unique to the measurement environment in question. The user then selects the sources of uncertainty that are to be taken into consideration in the measurement, based on which the computer program provides a mathematical model that incorporates parameters representing these sources of uncertainty. As used herein, the term 'parameter' refers to a component in the mathematical model representing a selected source of uncertainty. The source of uncertainty may be proposed by a computer program from a database, or it may be proposed by a user. Alternatively, the mathematical model may be completely provided by a human user, wherein the user computes the mathematical model into the software program In one embodiment, the sources of uncertainty selected for consideration in the measurement of the DUT are provided in a database. Such a database may be in the form of a Microsoft Access database file, or an Oracle database, or in a text file in the form of a simple text list, depending on the software that is implemented for carrying out the method. In this embodiment, the sources of uncertainty are predetermined based on prior experience in the specific measurement to be carried out. Accordingly, such a database may contain information about the sources of uncertainty for one or for several types of measuring equipment. The criteria for selecting sources of uncertainty are determined from established knowledge of the sources of uncertainty in the environment in which the measurement of the device under test is carried out. However, rules may be established to assist an inexperienced user to determine which sources of uncertainty are important for a particular measurement environment or for a particular set of measurement equipment, and which should therefore be selected for carrying out the method of the invention.

Depending on the selection of the sources of uncertainty, additional measuring equipment may be required to carry out additional measurements pertaining to physically observable variable. For example, additional measuring equipment may be required to measure temperature, pressure and/or humidity of the measurement environment if the selected sources of uncertainty are associated with these variables. In this case, the mathematical model may optionally be modified accordingly by introducing correction terms into the mathematical formula to take into account the error introduced by such sources of uncertainty.

In a preferred embodiment, each physically observable variable characterising a selected source of uncertainty is measured and statistically evaluated in order to provide a user with information about each source of uncertainty. Based on this information, a user can then decide whether the source of uncertainty is to be taken into consideration for the evaluation of combined uncertainty. The measurements of each physically observable variable is preferably used to determine a correction term that is incorporated into the mathematical model to take into account the effect of the selected source of error. The determination of a correction term may be carried out by evaluating a value of at least one statistical factor associated with the data form the measurements. Statistical factors may comprise one of the following: mean, median, mode, deviation, unbiased estimate, covariance, most probable value, probability density function, half width of probability density function, standard uncertainty and estimated degree of freedom.

As used herein, the 'term' factor refers to the statistical issues to be analysed for each source of uncertainty, such as most probable value, degree of freedom, for example. The term 'unit' refers collectively to the statistical factors of each uncertainty parameter.

Once the values of these statistical factors have been established, a user may then choose to use the as-calculated statistical factors in the evaluation of the combined uncertainty, or the user may partially or completely modify the values of these factors, or to completely delete these values and to replace them with other values (i.e. not take the measured values into consideration in the evaluation of combined uncertainty). Apart from the parameters that are proposed from an existing database containing information about the sources of uncertainty, a user may also introduce into the mathematical formula other parameters obtained from the user's extensive experience or scientific knowledge, i.e. established empirically.

The correction term that is to be incorporated into the mathematical formula may be derived from the statistical factors by applying an empirically developed conversion formula to calculate a correction term from the most probable value of the physically observable variable. The calculation of the correction term may be facilitated by a computer program. To calculate correction term, the statistical factors which are required may include, in one preferred embodiment, at least one of the following 6 values: most probable value, probability density function, half width of probability density function, standard uncertainty and estimated degree of freedom.

The measurement of each of the at least one physically observable quantity, as well as the reference value of the reference device, may be repeated for a predetermined number of times, depending on factors such as the user's preference and the resources allocated to carrying out the measurement. As mentioned earlier, a larger number of measurements can help to reduce the influence of random errors on the measurand.

In a preferred embodiment, the method for carrying out measurements of each of said at least one physically observable quantity is adapted to minimize the introduction of uncertainty in the measurement of the device under test. This may be implemented based on a set of best practices for performing a particular measurement, such that a minimal amount of uncertainty is introduced into the measurement. The best practices for carrying out a particular measurement are typically established through experience.

The evaluation of standard uncertainty and combined uncertainty may be calculated according to any established method, preferably being in compliance with the ISO Guide to the Expression of Uncertainty in Measurement (ISO-GUM). In carrying out the method in accordance with ISO-GUM, the at least one uncertainty value required for the evaluation of uncertainty includes values such as type of evaluation, probability density function, coverage factor, sensitivity coefficients, effective degrees of freedom and expanded uncertainty.

The invention further provides a system for evaluating uncertainty in the measurement of a physically observable quantity in a device under test. The system comprises measuring equipment for obtaining a reference measurement of the measurand and measurements of each of said at least one physically observable quantity. A process control equipment unit is used to control the measuring equipment, while a computer programmed process control unit is used to evaluate uncertainty associated with the value of a measurand derived from measurements of the device under test. The entire system carried out measurement procedures according to the methods mentioned above, including the mathematical model provided by a user. The computer programmed process control unit comprises an input device, a control device, a record device for recording measurement data and input data, a display device, and an evaluation device.

In a preferred embodiment, the measuring equipment of the system comprises a switch box for automating the measurement of electrical resistance of a device under test and a standard resistor providing a reference value, the switch box comprising: a first connector for attaching the device under test, a second connector for attaching the reference device, and a resistance measurement function provided by a digital multimeter.

The switch box may comprise an data communication port for establishing a connection to a computer. An example of a communication port includes a USB port, a parallel port or a serial port. The data communication port may be connected to a digital parallel output interface card. The switch box may additionally comprise a connection port to connect the switch box to measurement equipment. Example of connection ports include ports allowing 5 pinned data cables to be connected thereto. The switch box may include a low thermal switch. The switch box may further comprise a two-way switch device for establishing a connection to the DUT and to the reference standard. AC adapters powering respectively the data communication port, the digital parallel output interface card, as well as the low thermal switch box, as well as any other component requiring electricity.

Figure 2:
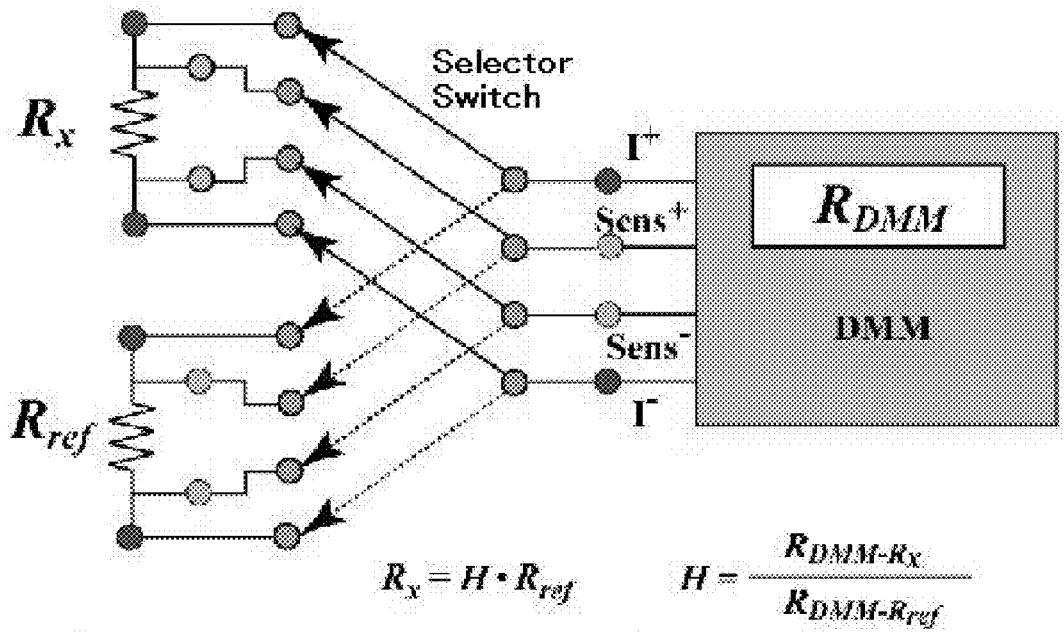
FIG. 2 is an example of a theoretical model for resistance measurement.

Referring to FIG. 1, the procedure of calculating uncertainty according to ISO-GUM is depicted. In general, 8 steps are involved. First, the values of the components constituting the mathematical model, i.e. the measurand and the input values, should be identified. For example as illustrated in FIG. 2, $R_x$ is the resistance of the resistor that is to be measured, and $R_{ref}$ represents the resistance of a reference resistor. H, the resistance ratio of $R_x$ to $R_{ref}$, can be measured by a digital multimeter (DMM). Any digital multimeter may be used for this purpose, such as the digital multimeter model HP34401A manufactured by Hewlett Packard. $R_{ref}$ and H are input values, and therefore $R_x$ can be obtained by substitute the observed values of $R_{ref}$ and H into the model $R_{ref}$=H·$R_{ref}$. In the first step, the measurand and the input values are thus identified with the mathematical model defining the relationship between the measurand and the input values.

Steps 2, 3 and 4 relate to the evaluation of input values. Here, four kinds of factors need to be calculated: estimate of each input value, standard uncertainty for each input estimate, degree of freedom and covariance if some or all of input values are mutually dependent. When repeated observations of the input values are available, a statistical analysis can be undertaken to calculate the above mentioned four factors based on probability density function of normal distribution. If repeated observations are not available, a probability density function (PDF) of rectangular form will be assigned for each input value on the basis specification or as the result of a previous uncertainty evaluation, and the above parameters can be calculated thereof from the PDF. Apart from a rectangular probability density function, other types of probability density functions such as Gaussian probability density function, triangular probability density function, or any other user-specified probability density function may be used.

In the 5$^{th}$ step, an estimate of the measurand is obtained from the mathematical measurement model. Next, the combined standard uncertainty of the measurand, the effective degrees of freedom and the coverage factor are calculated with the parameters relating to the input values obtained in steps 2-4. The 7$^{th}$ step then calculates the expanded uncertainty by multiplying the combined standard uncertainty of the measurand by the coverage factor. Finally an uncertainty budget table is generated reporting the result of uncertainty, including each component which contributes to the uncertainty of the measurement.

The above procedure is defined in the ISO-GUM. At present no mathematical solution is provided to present evaluation on the sources of uncertainty. In practical situations, sources of uncertainty need to be identified in order to obtain an accurate mathematical model for relating the measurand to such sources of uncertainty. However, identification of the sources of uncertainty is complicated and difficult for engineers, technicians and researchers without long period experience in metrology field.

Figure 3:
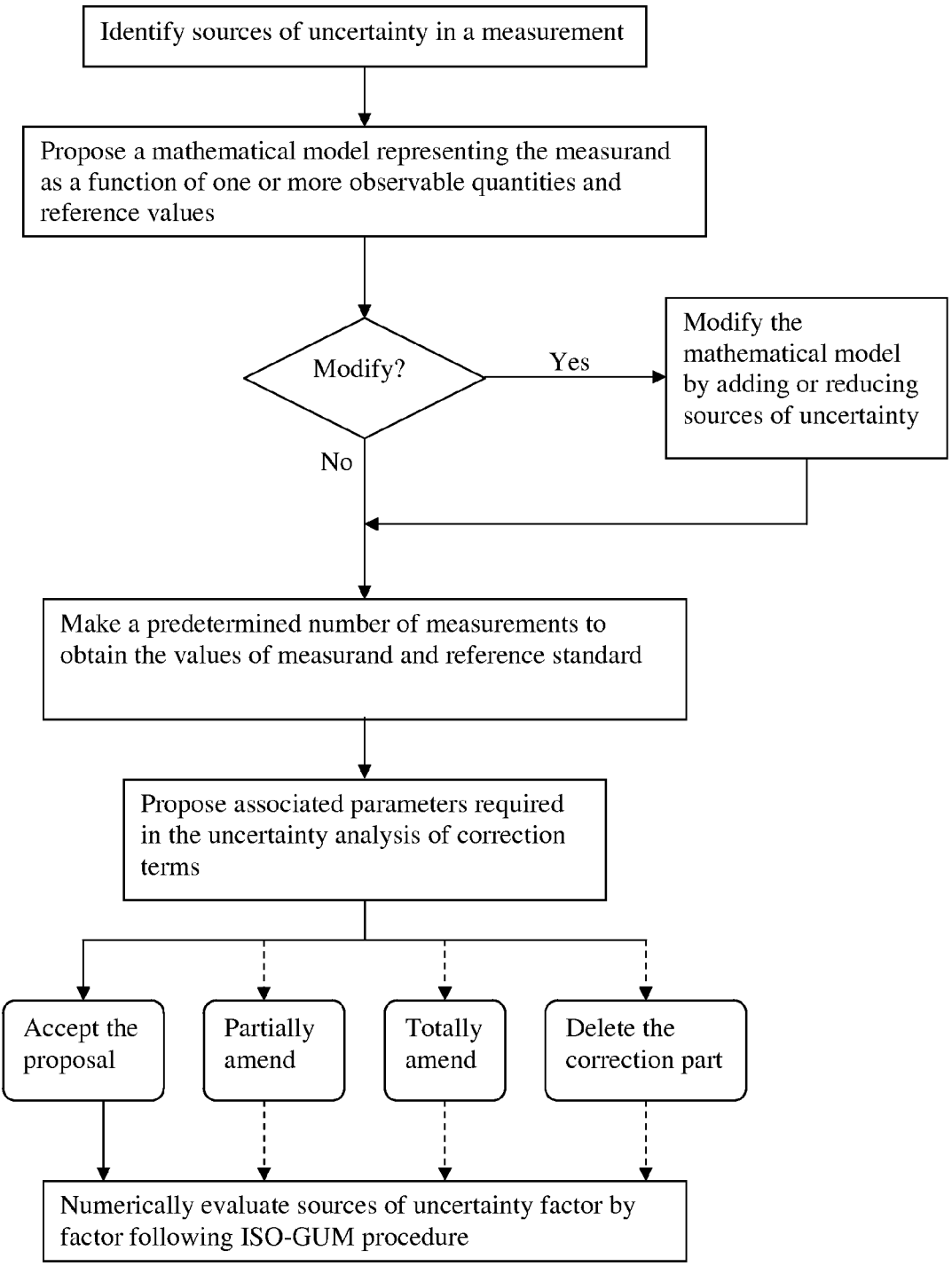
FIG. 3 is the procedure of uncertainty evaluation according to one embodiment of this invention.

Based on extensive understanding and metrological experience about sources of uncertainty, the present invention provides possible sources of uncertainty before numerical evaluation. FIG. 3 illustrates a procedure corresponding to one embodiment of the present invention. Firstly, all the sources of uncertainty in a measurement are proposed. Accordingly, all the components associated with these sources of uncertainties including correction terms, are incorporated into a mathematical model which represents the measurand as a function of at least one physically observable quantity and reference value of a reference device. As a result, the mathematical model is composed of directly measured value, indirectly measured value and corrections. Take the example of FIG. 2, the theoretical formula that is mathematically and physically recognized is $$R_x = H \cdot R_{ref} \quad (1)$$

In this invention, the possible sources of uncertainty and all the associated corrections are proposed to constitute the mathematical model in practical evaluation as follows:

$$R_x = (H + \Delta H_{rinp} + \Delta H_{resol} + \Delta H_{leak} + \Delta H_{ther} + \Delta H_{add}) \cdot (R_{ref} + \Delta R_{ref.temp} + \Delta R_{ref.power} + \Delta R_{ref.drift} + \Delta R_{ref.trans} + \Delta R_{ref.add}) + \Delta R_{x.add1} + \Delta R_{x.add2} \quad (2)$$

Physical meaning of each component in the above mathematical model is clarified in FIG. 4. For example, H is the ratio of $R_x$ to $R_{ref}$ directly obtained from DMM readings, and $\Delta H_{rinp}$ represents correction to H associated with DMM input resistance due to the limited resistance of the DMM, which deviates from the assumed ideal value of infinite resistance. The most probable value of minimum resistance of the DMM may be found in the technical specification provided by the manufacturer or it may be measured. Accordingly, in a preferred embodiment, a computer program may be written to propose the manufacturer-provided value by default, and a user may subsequently carry out measurements to verify the manufacturer-provided value, i.e. whether or not it is between Sens+ and Sens− of the DMM. Where measurements are carried out by a user, statistical analysis is used to determine the most probable value of minimum resistance of the DMM. Once the user confirms the minimum input resistance to be used, the computer program then proceeds to calculate the correction term $\Delta H_{rinp}$.

Calculation of the value of each correction term may be carried out by applying an empirically developed conversion formula or a conversion factor to calculate obtain the correction term from the most probable value of the minimum input resistance in this example, or in a general case, the physically observable variable. The calculation of the correction term may be facilitated by a computer program. For example, if the minimum input resistance of the DMM is 10 giga $\Omega$, and the conversion factor is $1 \times 10^{-12}$ $\Omega^{-1}$, then the value of the correction term $\Delta H_{rinp}$ is 10 giga $\Omega \times 1 \times 10^{-12}$ $\Omega^{-1} = 1 \times 10^{-3}$.

It is a specific feature of this method that the mathematical model can be optionally modified by a user. If the level of uncertainty is to be reduced, components of the sources of uncertainty which compose the mathematical model can be selectively modified or removed, such that the contributors to the uncertainty are lessened. For example, $\Delta H_{rinp}$ can be removed from parameters for the evaluation of uncertainty, in other words from the mathematical model if user considers that it is not a serious source of uncertainty for the purpose of the measurement. It is to be noted that there is an option to modify the model by user's determination, in order to introduce additional sources not specified in the model. In equation (2), $\Delta H_{add}$ means additional sources can be included in the parameters for the evaluation of uncertainty.

Whether or not the mathematical model is to be modified, the measurement is carried out to obtain the values of the input values after the mathematical model is confirmed. The measurement can be made for a number of times determined by the user. With the observable input values, the estimate of measurand can be calculated according to the defined mathematical model.

The next step is to evaluate correction terms associated with sources of uncertainty. Necessary parameters in relation to these correction terms are proposed, such as estimated most probable value of correction, form of probability of density, estimated uncertainties of standard uncertainties and estimated value of degree of freedom. These proposed parameters can be modified. As depicted in FIG. 3, the proposal can be fully accepted without amendment. Alternatively, the proposal can be partially amended with the rest unchanged. It is a third option to amend the whole proposal by the user's consideration. It is also allowed to delete the entire correction term.

According to ISO-GUM procedure as depicted in FIG. 1, sources of uncertainty are then evaluated factor by factor and finally combined to arrive at the ultimate expanded uncertainty.

As another embodiment of this invention, a software application with user-friendly graphic interface is developed to execute the whole procedure. The software can be written in any computer programming languages which support user interface generation. Preferably, the software is written in object-oriented language, such as C++, Visual Basic, Java.

The software application is preferably executed in a computer system. It can also be run on any equipment with central processor, memory, display device and input device connected and combined.

Since the process of uncertainty analysis is quite complicated, the software provides an automatic approach to carry out the evaluation of measurement uncertainty while at the same time allows user interaction. For every step in the procedure, there is a graphic interface providing explanation to this step or requiring input, modification and confirmation to continue to the next step.

Figure 5:
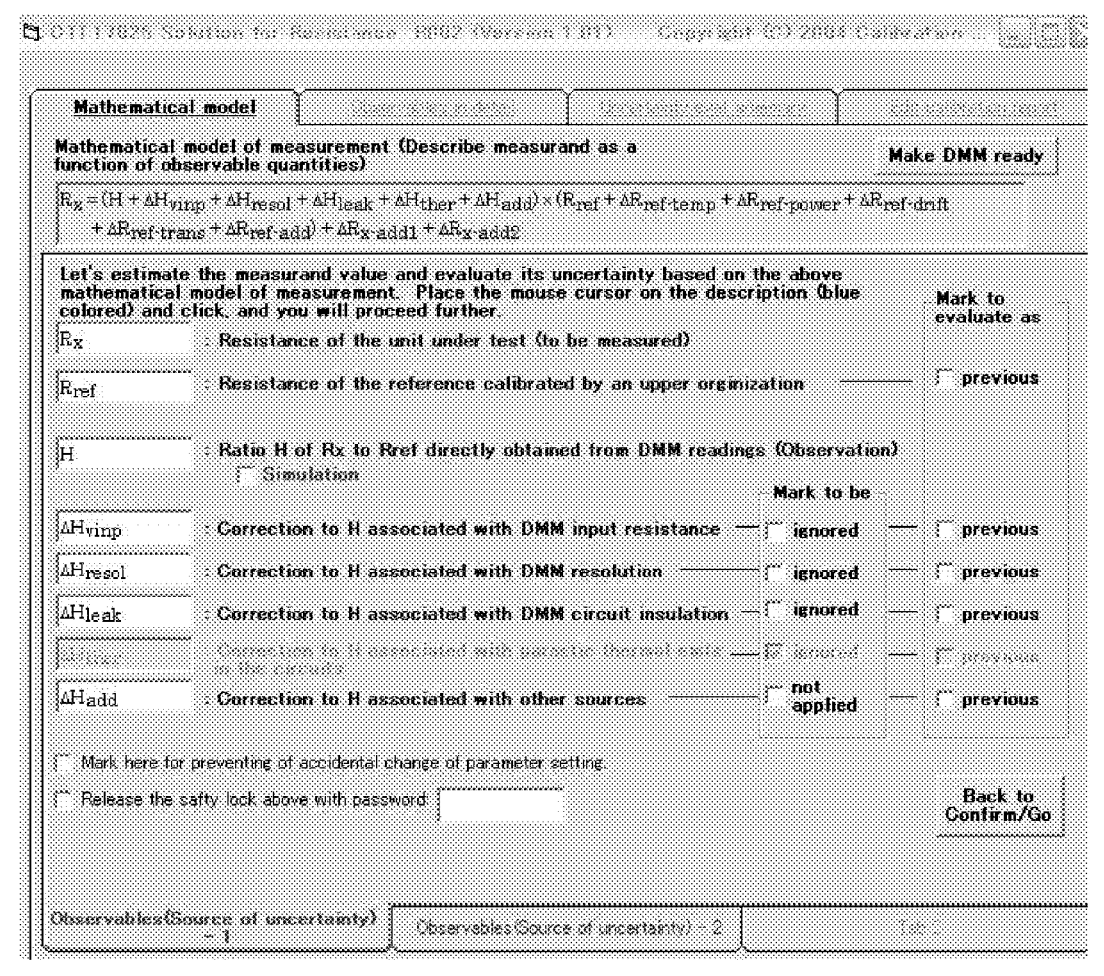

FIG. 5 is one example of graphic interface, in which the mathematical model is already proposed and displayed. The physical meaning of each component in the mathematical model is also explained in sequence. Each correction term has a corresponding rectangle related to "ignored". If the user intends to remove one correction term, the corresponding rectangle can be selected so that this correction term does not contribute to the evaluation of uncertainty, such as $\Delta H_{ther}$ which is shown in grey meaning that it is eliminated.

Figure 6A:
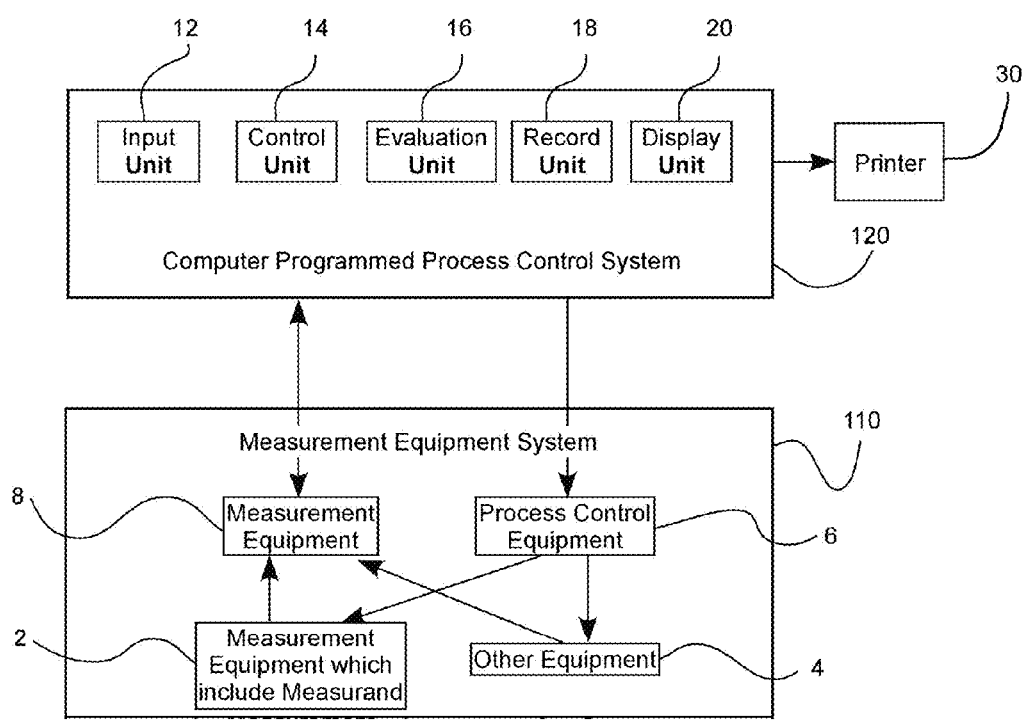
FIG. 6A is a third embodiment of the system implementing the method of the invention.

The software is accordingly capable of automatic evaluation of uncertainty when it is written according to the evaluation method explained above. In a third embodiment of this invention, a system is provided containing both mathematical evaluation and physical measurement. FIG. 6A shows an example of said system which is composed of a measurement equipment system 110 and a computer programmed process control system 120.

The measurement equipment system 110 contains several kinds of measurement equipments. Measurement equipment which includes measurand 2 comprises one or more equipment used to measure the desired physical quantity, e.g. $R_x$ in FIG. 2. Measurement equipment 8 includes one or more equipment to measure input values of the mathematical model, such as H which can be directly obtained from DMM readings. Accordingly, measurement equipment 8 can be any measurement equipment, such as a DMM, a thermometer, and a barometer. Other equipment 4 includes other necessary equipments to be used in the measurement. The measurement equipment system 110 also includes a process control equipment 6, which receives command from the computer programmed process control system 120 and operates all the measurement equipments 2, 4 and 8 for automatic measurement without user interaction. The process control equipment 6 can be any equipment or even simple controlling chips that are capable of process control.

The computer programmed process control system 120 consists of input device 12, control device 14, evaluation device 16, record device 18 and display device 20. The whole system 120 is preferable a computer system. The computer programmed process control system 120 is the control center for the execution of the whole process including physical measurement and subsequent evaluation of uncertainty associated with the measurement.

Preferably, the computer programmed process control system 120 is, but not limited to, a computer. Accordingly, the input device 12 can be keyboard and mouse to obtain initial information and administrative information. The initial information refers to the information associated with measurand and reference standard, which are input before measurement, such as nominal value of measurand and reference standard, level of uncertainty of reference standard provided by upper calibration laboratory. The administrative information may include equipment serial number of measurand and reference standard, purchase date, name of measurer, client name, name of data file and measurement environment, such as temperature, humidity, air pressure.

CPU of the computer can work as evaluation device 16, which performs the numerical evaluation of uncertainty by doing statistical treatment based on measured data collected from the measurement equipment system 110 and input device 12. Evaluation device 16 enables user to calculate measurand's most probable value of measured value, expanded uncertainty, coverage factor and degree of freedom. Before such calculation, the evaluation device 16 provides world acceptable mathematical model with parameters of sources of uncertainty with each source's estimation of form of probability of density function and estimation of standard uncertainty, based on which the above mentioned calculation of uncertainty parameters can be carried out according to ISO-GUM.

Record device 18 is the memory of the computer. The information obtained from input device 12 can be recorded. Besides that, basic data used for the evaluation of uncertainty can also be recorded, such as estimate of most probable value, estimated probability density function, estimated value of standard uncertainty, estimation of degree of freedom of directly measured value, indirectly measured value and corrections.

Display device 20 can be a monitor which displays the proposed mathematical model, the initial information and administrative information on the screen. In addition, the basic data recorded by record device 18 is displayed to user. Display device 20 also displays ultimate uncertainty evaluation budget table which is recognized as world standard and the calibration certificate conformed to ISO 17025 standard. When the software implementing the method of this invention is run on the system, graphic interface of each step is also displayed for user input and confirmation.

Control device 14 is a controlling part, e.g. CPU of a computer, to control and communicate between the measurement equipment system 110, input device 12, evaluation device 16, record device 18 and display device 20. The execution of the software for uncertainty evaluation is controlled by control device 14. Accordingly, the modification of the mathematical model and the proposed data used for uncertainty analysis, e.g. partially amendment of the proposed parameters in FIG. 3, is made by control device 14.

Furthermore, control device 14 controls the execution of measurement by sending command to process control equipment 6 which is able to operate measurement equipment to start automatic measurement. The number of times of measurement and number of data to be collected by the option of user is also controlled by control device 14. It is a special feature of the control device 14 that it can provide appropriate way to reduce the level of uncertainty by reducing factor of uncertainty which would affect the measurement condition or deviation of uncertainty. For example, the measurement equipment is controlled to be connected based on a set of best practices for performing a particular measurement that has been established through user's metrological experience.

After measurement by the measurement equipment system 110, control device 14 is responsible for collecting the measured value and fundamental data necessary for uncertainty evaluation which may be modified by user. Upon receiving the command from control device 14, evaluation device 16 then begins evaluating level of uncertainty with the calculation of most probable value, expanded uncertainty, coverage factor and degree of freedom based on the proposed mathematical model.

A printer 30 is connected with the computer programmed process control system 120. When the uncertainty evaluation is completed, the generated uncertainty evaluation budget table and calibration certificate can be printed out through the printer 30.

Figure 6B:
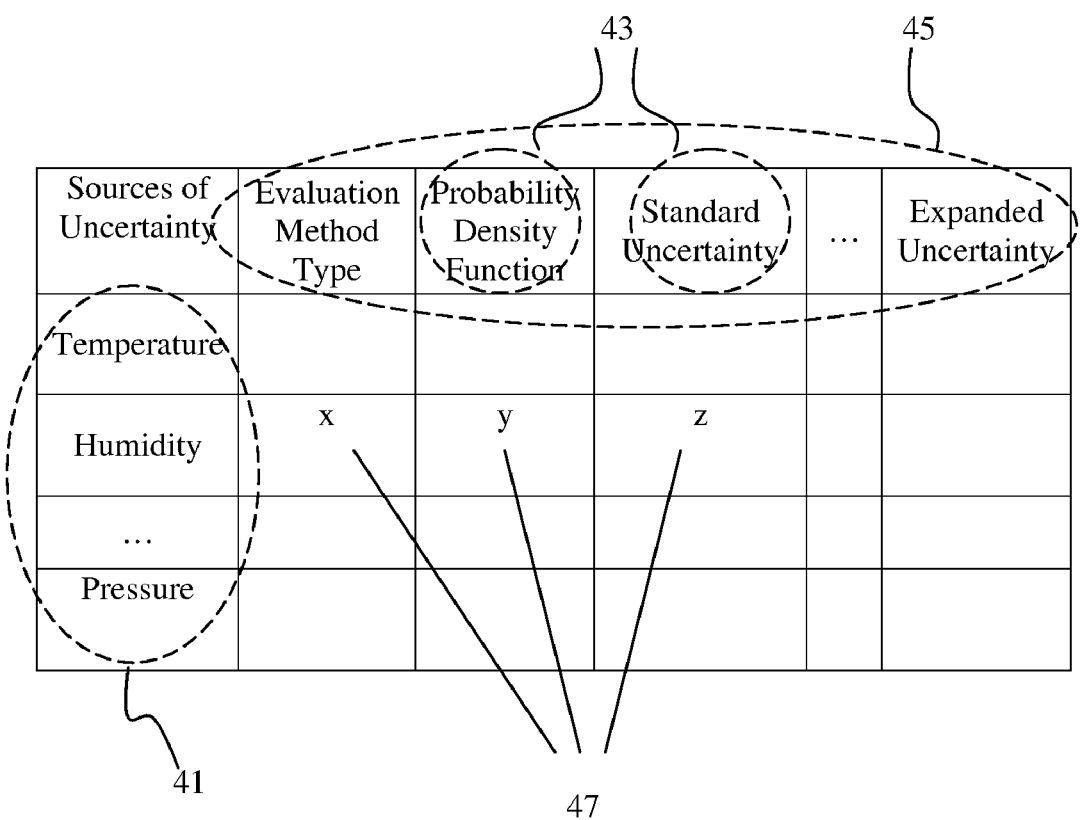
FIG. 6B shows a budget table prepared by the system.

FIG. 6B is an example of an uncertainty budget table applicable to any measurand. The physically observable variables representing each selected source of error 41, also referred to as 'parameters' which are taken into consideration in the mathematical model for the evaluation of uncertainty, are measured and statistically analysed. Parameters are tabulated in the leftmost column in the budget table. The values of the statistical factors 43 of each parameter obtained from the statistical analysis, also collectively referred to as a 'unit' 45 of the parameter, is tabulated row-wise in the budget table for each parameter. The alphabets x, y, and z are dummy numerical 'values' and statistical descriptions 47 described in ISO-GUM of the statistical factors 'Evaluation Method Type', 'Probability Density Function', and 'Standard Uncertainty', respectively, for the parameter 'Humidity' in the budget table.

Figure 7:
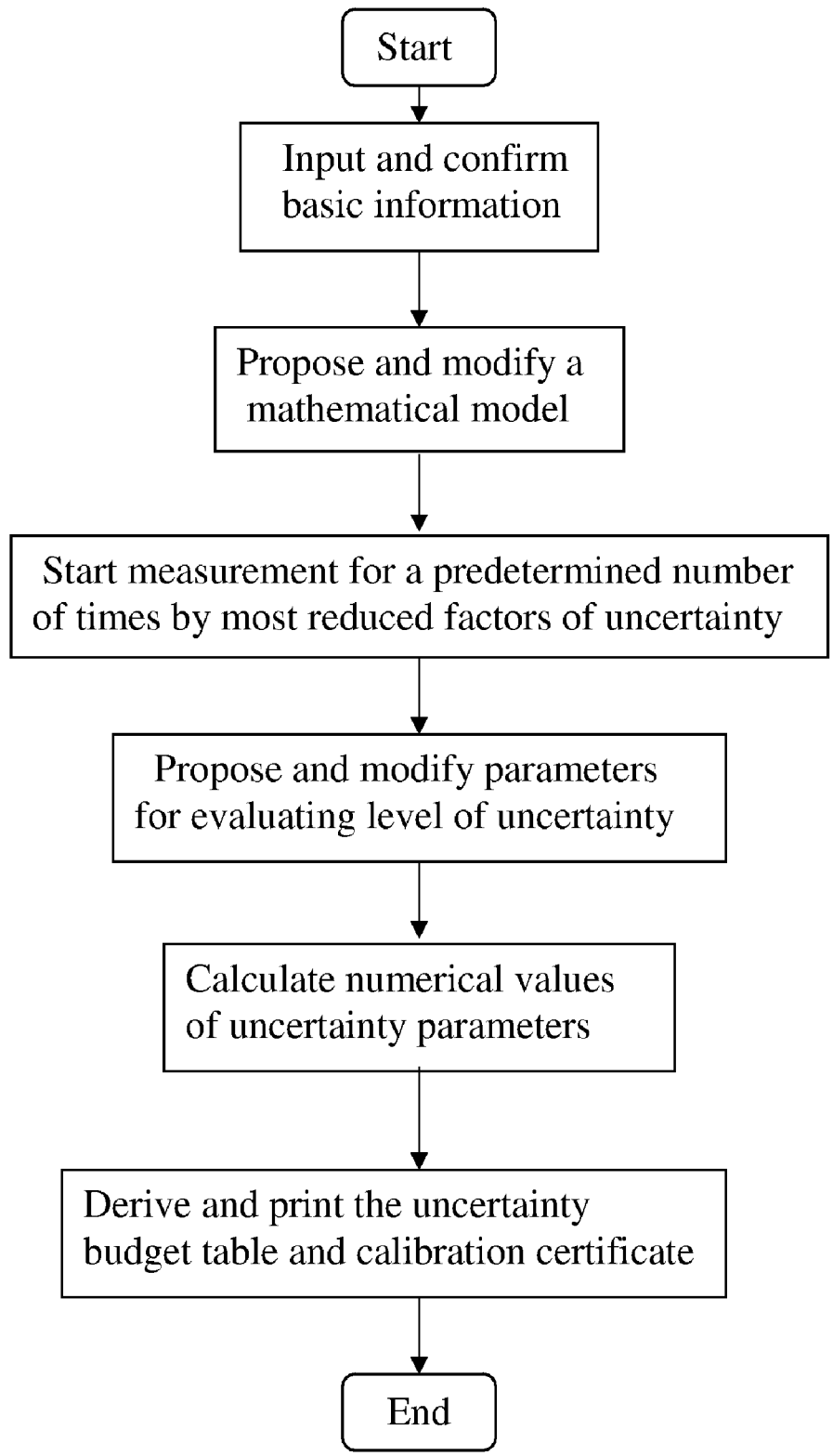
FIG. 7 illustrates the procedure to carry out measurement and uncertainty evaluation according to the third embodiment of this invention.

FIG. 7 summarizes the procedure of carrying out measurement and uncertainty evaluation on the system of the present invention. When the system is ready for operation, the user is required to input the initial basic information and confirm such information to continue to the next step. For different measurand, there are different mathematical models which are predefined by long period experience in metrology field. Upon confirmation of the measurand, a mathematical model is displayed in accordance to the measurand. User may choose to modify the mathematical model based on measurement condition. Then the measurement equipments are executed to measure the observable values of measurand and reference standard. The measurement equipments can be controlled to take appropriate way of measurement by most reduced factors of uncertainty.

After measurement values for measurand and reference standard are obtained, the system begins the numerical evaluation of sources of uncertainty based on the sources selected by user. It firstly considers the selection of sources of uncertainty proposed by the system and then considers the way of execution of evaluation of uncertainty source by source with or without correction of each source of uncertainty. The whole sources of uncertainty selected by user would be called parameters of evaluation of uncertainty. Whatever the mode, the parameters are finally confirmed and then transferred to calculate the numerical values of uncertainty parameters according to ISO-GUM. At last, the uncertainty budget table is generated with the parameters of each source listed. User may choose to verify and sign for the derived results and print the uncertainty budget table and calibration certificate which are conformed to international standard.

Figure 8:
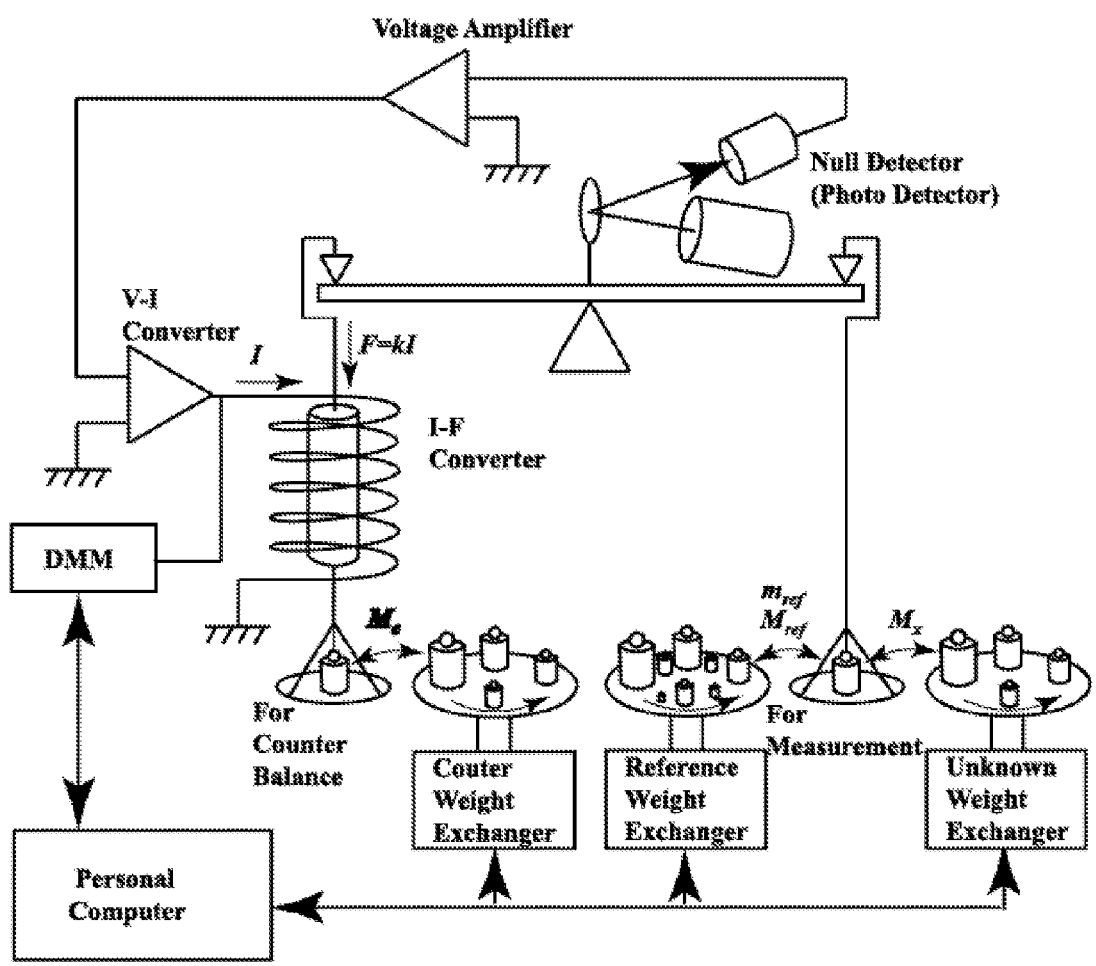
FIG. 8 shows a precise mass measurement framework according the fourth embodiment of this invention.

In a fourth embodiment of the present invention, a specific system for automatic mass measurement and uncertainty evaluation is provided. FIG. 8 shows a precise mass measurement framework wherein a computer serves as the computer programmed process control system containing the program for uncertainty evaluation. Photo detector, counter balance table and measurement balance table together form the comparator for comparing the weight at the two balance tables. Voltage amplifier, V-I converter, I-F converter work together as a balancing device for automatic controlling the balance between counter balance table and measurement balance table. Comparator and balancing device are not direct measurement equipments, but are necessary equipments for the measurement. (Please check if the above explanation is correct) Necessary equipments also include counter weight exchanger, reference weight exchanger and unknown weight exchanger, wherein calibrated counter weights, calibrated reference weights and unknown weights are located before the measurement starts. DMM is used to measure input values, in this case, the feedback electric current I. Other measurement equipments, e.g. a thermometer, and process control system connecting between measurement equipment and computer, are parts of the system, which are not displayed in FIG. 8.

In order to measure unknown weight $M_x$, a counter weight $M_c$ and two reference weights including a main reference weight $M_{ref}$ and a sub-reference eight $m_{ref}$ are used. It is to be noted that the nominal values of $M_x$, $M_c$ and $M_{ref}$ are chosen to be the same. In the first step, a main reference weight is put on the measurement balance table, and a counter weight with the same nominal value is put on the counter balance table. A balance is obtained between the counter balance table and the measurement balance table. Then the balanced situation is described as $$M_{ref}=M_c+(k/g)I_{ref} \qquad (3)$$

wherein k/g is feedback electric current-mass conversion factor, and $I_{ref}$ is feedback electric current obtained from DMM reading when the main reference weight is put on the balance table.

Similarly, the sub reference weight $m_{ref}$ is added to the measurement balance table, and balanced situation is described as $$M_{ref}+m_{ref}=M_c+(k/g)I_{cal} \qquad (4)$$

wherein $I_{cal}$ is feedback electric current obtained from DMM reading when both $M_{ref}$ and $m_{ref}$ are put on the balance table.

Combing equation (3) and (4), the following formula can be obtained $$k/g=m_{ref}/(I_{cal}-I_{ref}) \qquad (5)$$

Since $m_{ref}$, $I_{cal}$ and $I_{ref}$ are observable values, k/g can be obtained from equation (5) accordingly.

The next step is to put unknown weight onto the measurement balance table. The corresponding balance situation is described as $$M_x=M_c+(k/g)I_x \qquad (6)$$

wherein $I_x$ is feedback electric current obtained from DMM reading when unknown eight is put on the measurement balance table.

Combining equation (3), (6) and taylor model, unknown weight can be obtained by the model $$M_x=[1+(k/g)(I_x-I_{ref})/M_c]M_{ref} \qquad (7)$$

Since $I_x$, $I_{ref}$, $M_c$, $M_{ref}$ are observable and k/g can be calculated, the value of $M_x$ can be obtained accordingly.

Equation (7) is the fundamental model for mass measurement according to the equipment settings in FIG. 8. In evaluation of measurement uncertainty, many factors which would contribute to the uncertainty of the measurand need to be considered. According to long-term experience, the present invention provides the mathematical formula for uncertainty evaluation which includes possible sources of uncertainty as follows:

$$M_x=[1+\{(k/g)_0+\Delta(k/g)_T\}\{(I_x-I_{ref})_T+\Delta(I_x-I_{ref})_{lin}+ \\ \Delta I_{res}\}/M_c]M_{ref}+\Delta M_{buo} \qquad (8)$$

wherein $$(k/g)_0=m_{ref}/(I_{cal}-I_{ref})_0$$

A description of the components in the above equation is presented in FIG. 9. As we can see, all the factors that could affect the uncertainty of unknown weight $M_x$ are considered and included into the final mathematical model.

After the confirmation of the mathematical model for mass measurement, simply apply this model in step 3 of FIG. 7. The evaluation process is the same as what has been explained according to the procedure in FIG. 7.

REFERENCE

1. S. D. Phillips, W. T. Estler, M. S. Levenson and K. R. Eberhardt. "Calculation of Measurement Uncertainty Using Prior Information". *Journal of Research of the National Institute of Standards and Technology*, volume 103, No. 6, 1998.
2. Vicki J. Barwick and Stephen L. R. Ellison. "Measurement uncertainty: Approaches to the evaluation of uncertainties associated with recovery". *The Analyst*, volume 124, pp. 981-990, 1999.

3. M. G. Cox and P. M. Harris. "Software Specifications for Uncertainty Evaluation". *Report to the National Measurement System Directorate, Department of Trade and Industry*, 2004.

What is claimed is:

1. A method of evaluating uncertainty associated with a value of a measurand derived from measurements of a device under test, said method comprising:
    selecting sources of uncertainty associated with at least one of (i) the measurement of at least one physically observable quantity, (ii) the measurement of a reference value of a reference device, and (iii) the measurement of the value of the measurand;
    providing a mathematical model wherein the measurand is expressed as a function of (i) said at least one physically observable quantity, said at least one physically observable quantity being associated with at least one source of uncertainty in the measurement of the device under test and the measurement of the reference device, and (ii) the reference value in the reference device,
    measuring the reference value of the reference device and the value of the measurand of the device under test,
    measuring the value of said at least one physically observable quantity, and
    determining with a computer at least one uncertainty value as a function of said at least one physically observable quantity from said mathematical model,
    wherein said mathematical model takes into account the at least one source of uncertainty and the reference value of the reference device.

2. The method of claim 1 wherein the sources of uncertainty are selected from a database specifying possible sources of uncertainty.

3. The method of claim 2 wherein the selection is determined from established knowledge of the sources of uncertainty in the environment in which the measurement of the device under test is carried out.

4. The method of claim 2 wherein each of the selected source(s) of uncertainty is characterized by a physically observable variable.

5. The method of claim 4 further comprising measuring the physically observable variable characterizing each selected source of uncertainty.

6. The method of claim 5 further comprising determining a correction term from the physically observable variable, and modifying the mathematical model to include said correction term.

7. The method of claim 6 wherein said determination of a correction term comprises evaluating a value of at least one statistical factor associated with the physically observable variable.

8. The method of claim 7 wherein the statistical factor is selected from:
    covariance, type of evaluation, most probable value, probability density function, half width of probability density function, standard uncertainty and estimated degree of freedom.

9. The method of claim 1 wherein the measurement of each of the at least one physically observable quantity is repeated for a predetermined number of times.

10. The method of claim 1 wherein the user selects the sources of uncertainties of said measurand to determine the parameters for the evaluation of uncertainty based on the mathematical model.

11. The method of claim 1 wherein the at least one uncertainty value is selected from: type of evaluation, probability density function, coverage factor, sensitivity coefficients, effective degrees of freedom and expanded uncertainty.

12. A computer programmed so as to be used to carry out the method of claim 1.

13. A computer readable storage medium containing programming instructions for a computer to be used to carry out the method of claim 1.

14. A system for evaluating uncertainty in the measurement of a physically observable quantity in a device under test, comprising
    measuring equipment for obtaining a reference measurement of the measurand and measurements of reference standard of each of at least one physically observable quantity;
    process control unit for controlling said measuring equipment;
    a computer programmed process control unit for evaluating uncertainty associated with the value of the measurand derived from measurements of the device under test, said evaluation being based on a mathematical model comprising sources of uncertainty selected by a user, said computer programmed process control unit comprising
        an input device,
        a control device,
        a record device for recording measurement data and input data,
        a display device, and
        an evaluation device.

15. The system of claim 14 wherein the level of uncertainty is reduced by connecting measurement equipment based on a set of best practices for performing the measurement the device under test.

16. The system of claim 14 wherein the evaluation of each source of uncertainty is carried out after the process control equipment unit receives a command from the control device of the computer programmed process control unit.

17. The system of claim 16 wherein said computer programmed process control unit comprises a computer program element for executing a method for uncertainty evaluation.

18. The system of claim 17 wherein said computer program element further comprises a graphical user interface (GUI) that is displayed in said display device.

19. The system of claim 14 wherein the control device controls the measuring equipment through the process control equipment unit.

20. The system of claim 14 wherein the control device controls the input device, record device, display device, and evaluation device.

21. The system of claim 14 wherein said evaluation device carries out the evaluation of the value of at least one statistical factor associated with the physically observable unit.

22. The system of claim 21 wherein said at least one statistical factor includes covariance, type of evaluation, most probable value, probability density function, half width of probability density function, standard uncertainty and estimated degree of freedom.

23. The system of claim 14 wherein said evaluation device further evaluates an uncertainty value.

24. The system of claim 23 wherein said evaluation comprises determining a probability density function, expanded uncertainty, coverage factor, standard uncertainty, sensitivity coefficient, effective degree of freedom, and most probable value.

25. The system of claim 14 wherein said computer programmed process control unit is connected to a printing device for printing a calibration certificate.

26. The system of claim 25 wherein the measuring equipment comprises a means for automating the measurement of electrical resistance of a device under test and of a standard resistor providing a reference value.

27. The system of claim 26 wherein the means for automating the measurement of electrical resistance of a device under test and of a standard resistor providing a reference value comprise of a switch box comprising:

a first connector for connecting the device under test, a second connector for connecting the standard resistor, and a digital multimeter capable of measuring electrical resistance.

* * * * *